Figure 1:
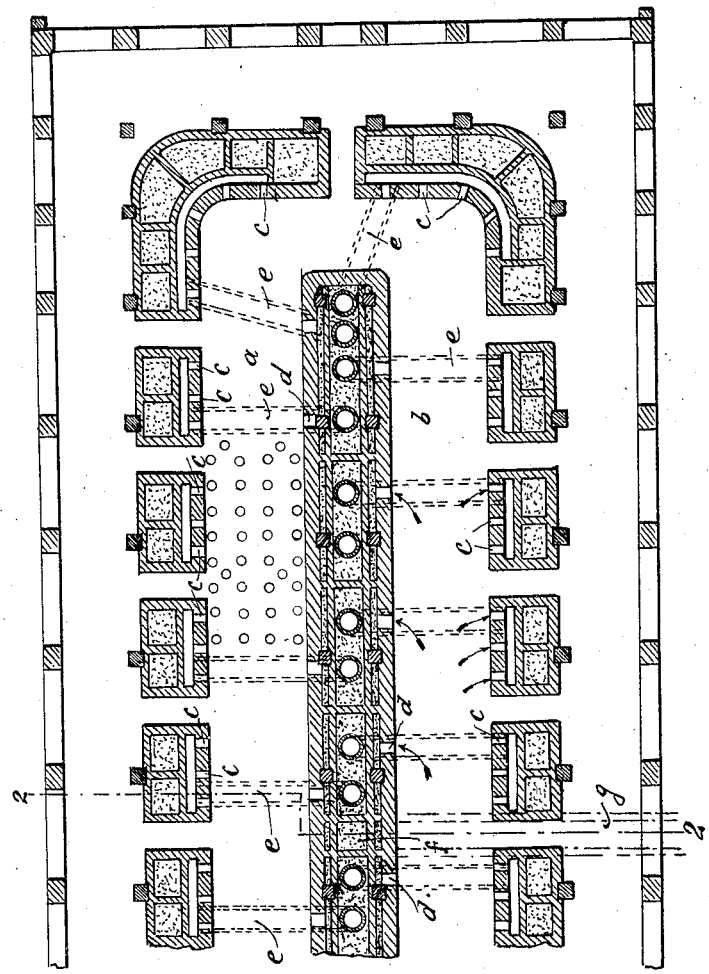

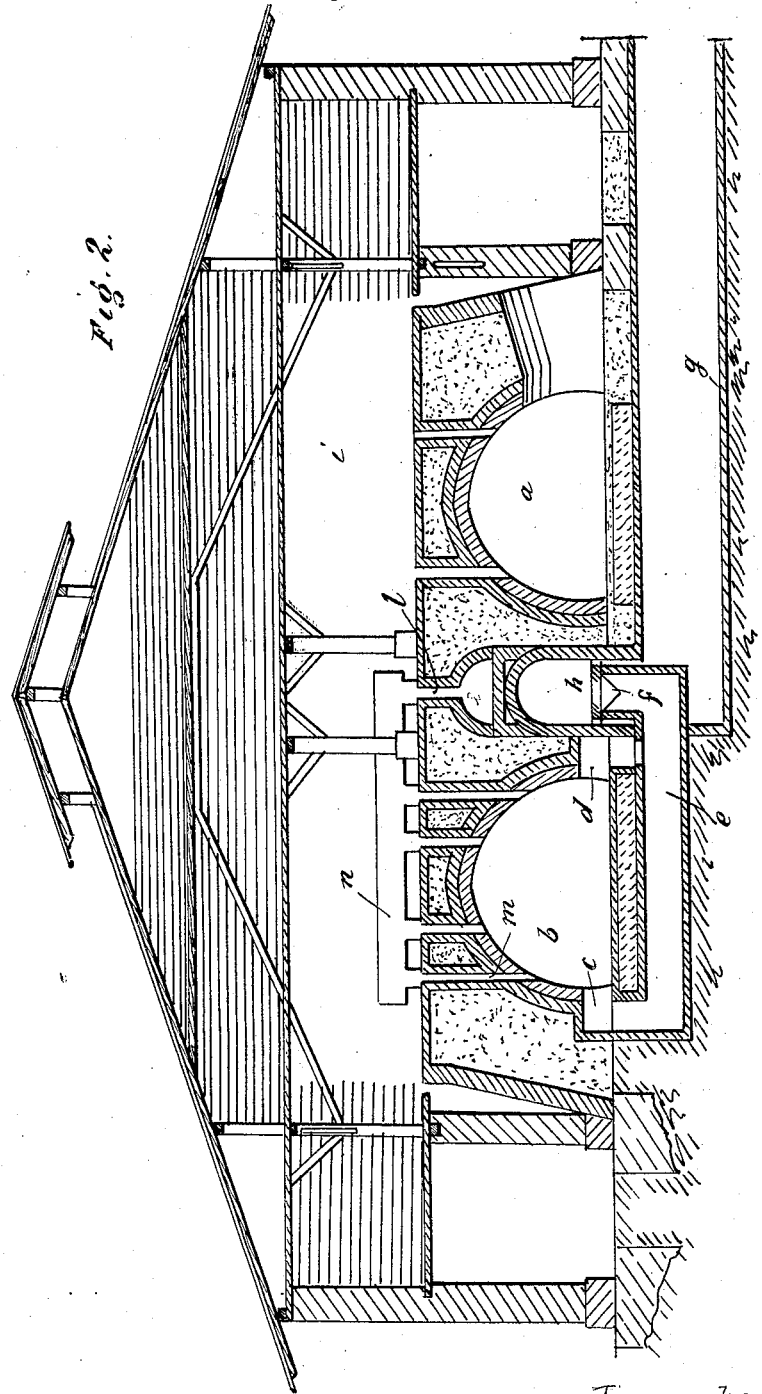

Patented June 18, 1929.

1,717,825

UNITED STATES PATENT OFFICE.

LUIGI ZILLI, OF SAN DANIELE DEL FRIULI, ITALY.

HOFFMANN FURNACE.

Application filed September 3, 1926, Serial No. 133,500, and in Italy September 16, 1925.

This invention relates to an improvement in Hoffmann furnaces which results in a greater uniformity of heat distribution and a better utilization of the same.

A method for carrying into practice the invention is shown in the annexed drawing, wherein:

Figure 1 is a partial plan view, and

Figure 2 a section on line 2—2 in Fig. 1.

—a— and —b— are the fire-channels in which the vault sections instead of being semicircular, converge slightly to a point at their upper ends, and the pillars instead of being vertical are arch shaped and slightly inflected at the bottom. In this manner contractions which always occur owing to the great heat in these walls of the fire-channel, are avoided.

For each section of the fire-channel I provide draught channels as, e. g., three channels —c—c—c—, within the external structure, and one —d— in the inner core, all being controlled by a single valve at —f— where the main draught pipe —g— enters —e—e— are the flues or passages connecting the inner core with the outer walls. Thus the drawback existing in the common Hoffmann furnaces of a considerable heat difference between the part of the channels located near the core of the furnace and those lying towards the outside is avoided; and owing to the arrangement here applied the heat is on the contrary uniformly distributed through the whole section of the fire-channel, moreover, the said channels serve as excellent collectors of moisture and contribute to furnish correctly burned and homogeneously coloured material.

Above the middle draught channel —h— and separated therefrom a second heat distributing channel —i— is provided which, by means of channels —l— and movable pipes —n—, may be put into communication with vertical channels —m— opening on the vault of the fire-channel.

When the material of a given section is burnt, for cooling it the mouths of channels —m— are opened and the heat is conveyed through pipes —n— to the middle channel —i—, from which through other pipes it is conveyed to another space or sections containing rough matter to be subjected to preliminary drying, so obtaining a great saving in the amount of heat to be supplied to the furnace.

The ends of the furnace instead of being formed with semicircular passages are flattened with rounded off edges; the space or heat section of the fire-channel will thus be almost equal to the side sections, and easy charging of the furnace is ensured.

Also, the roof is arranged in such a manner as to allow of a more rapid drying by reducing heat dispersion; moreover working also in the cold season without fear of frost is permitted.

It is to be understood that the particulars of structure and shape may vary in carrying the invention into practice without prejudice to the inventive idea.

Having now particularly described and ascertained the nature of my invention and in what manner the same is to be performed, I declare that what I claim is:

1. A furnace of the character described comprising a fire room vault, at least one draught channel in the core wall of the vault, a plurality of draught channels in the outer wall of the vault, a main draught channel communicating with the draught channels in the core wall and outer wall, and a single valve means for controlling the draught in all said draught channels.

2. A furnace of the character described comprising a fire room vault, at least one draught channel in the core wall of the vault, draught channels in the outer wall of the vault of a number greater than the number of the channels in the core wall, a main draught channel communicating with the draught channels in the core wall and outer wall, and valve means for controlling the draught in said draught channels.

3. A furnace as recited in claim 1 provided in its core wall with a second channel for distributing the heat from said vault to other vaults of the furnace, cooling holes opening into the vaults of the furnace, and movable pipes connecting said cooling holes with said second channel.

4. A furnace as recited in claim 1 provided with flattened ends connected to the sides of the furnace by curved connecting pieces, so as to obtain end sections similar in shape to the side sections.

Signed at Milan, Italy, August 1926.

LUIGI ZILLI.